United States Patent
Bakker et al.

(10) Patent No.: US 9,332,041 B2
(45) Date of Patent: May 3, 2016

(54) SYSTEM AND METHOD FOR PROVIDING A CIRCUIT SWITCHED DOMAIN NUMBER

(75) Inventors: Jan Hendrik Lucas Bakker, Irving, TX (US); Adrian Buckley, Tracy, CA (US); Andrew Allen, Mundelein, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 990 days.

(21) Appl. No.: 12/728,003

(22) Filed: Mar. 19, 2010

(65) Prior Publication Data

US 2010/0246780 A1    Sep. 30, 2010

Related U.S. Application Data

(60) Provisional application No. 61/162,991, filed on Mar. 24, 2009.

(51) Int. Cl.
| | |
|---|---|
| *H04M 11/04* | (2006.01) |
| *H04L 29/06* | (2006.01) |
| *H04M 7/12* | (2006.01) |
| *H04W 4/22* | (2009.01) |
| *H04L 12/66* | (2006.01) |
| *H04M 7/00* | (2006.01) |

(52) U.S. Cl.
CPC ............ *H04L 65/1096* (2013.01); *H04L 65/40* (2013.01); *H04M 7/128* (2013.01); *H04W 4/22* (2013.01); *H04M 7/006* (2013.01); *H04M 2242/04* (2013.01); *H04M 2242/30* (2013.01)

(58) Field of Classification Search
CPC ............ H04L 29/12896; H04L 61/106; H04L 61/3085; H04L 61/605; H04L 65/1006; H04L 65/104; H04L 65/1069; H04L 65/1096; H04M 3/42042; H04M 7/127

USPC ........... 379/45, 142.07, 38; 455/401.1, 404.2; 370/352

See application file for complete search history.

(56) References Cited

U.S. PATENT DOCUMENTS

| | | | |
|---|---|---|---|
| 6,571,092 B2* | 5/2003 | Faccin | H04M 3/5116 |
| | | | 455/404.1 |
| 7,174,191 B2 | 2/2007 | Doble | |
| 2002/0111159 A1* | 8/2002 | Faccin et al. | 455/422 |
| 2004/0137873 A1 | 7/2004 | Kauppinen et al. | |
| 2004/0156394 A1 | 8/2004 | Westman | |
| 2004/0203572 A1* | 10/2004 | Aerrabotu | H04W 4/22 |
| | | | 455/404.1 |
| 2007/0060097 A1 | 3/2007 | Edge et al. | |
| 2008/0043989 A1* | 2/2008 | Furutono et al. | 379/269 |
| 2009/0122793 A1* | 5/2009 | Yang | 370/352 |
| 2010/0040049 A1* | 2/2010 | Benedyk | H04L 29/12896 |
| | | | 370/352 |
| 2010/0124897 A1* | 5/2010 | Edge | 455/404.1 |
| 2011/0310774 A1* | 12/2011 | Yang | H04L 65/40 |
| | | | 370/259 |
| 2012/0236794 A1* | 9/2012 | Jones | H04L 29/12622 |
| | | | 370/328 |

OTHER PUBLICATIONS

PCT International Search Report; PCT Application No. PCT/US10/28021; Jun. 1, 2010; 2 pgs.

(Continued)

*Primary Examiner* — Solomon Bezuayehu
(74) *Attorney, Agent, or Firm* — Conley Rose, P.C.; J. Robert Brown, Jr.

(57) ABSTRACT

A method is provided for identifying a device during an emergency for callback. The method includes storing an address of a user agent (UA) during initiation of an emergency call by the UA, associating an E.164 number with the stored address of the UA that placed the emergency call, and routing the emergency call containing the E.164 number.

16 Claims, 10 Drawing Sheets

(56) References Cited

OTHER PUBLICATIONS

PCT Written Opinion of the International Searching Authority; PCT Application No. PCT/US10/28021; Jun. 1, 2010; 4 pgs.
3GPP TS 23.167 v9.0.0; 3rd Generation Partnership Project; Technical Specification Group Services and System Aspects; IP Multimedia Subsystem (IMS) Emergency Sessions (Release 9); Mar. 2009; 35 pgs.
3GPP TS 22.101 v9.2.0; 3rd Generation Partnership Project; Technical Specification Group Services and System Aspects; Service Aspects; Service Principles (Release 9); Dec. 2008; 56 pgs.
3GPP TS 23.228 v8.7.0; 3rd Generation Partnership Project; Technical Specification Group Services and System Aspects; IP Multimedia Subsystem (IMS); Stage 2; (Release 9); Dec. 2008; 244 pgs.
3GPP TS 23.870 v8.7.0; 3rd Generation Partnership Project; Technical Specification Group Services and System Aspects; Service Aspects; SR VCC Support for IMS Emergency Calls; (Release 9); Feb. 2009; 15 pgs.
3GPP TS 24.229 v8.6.0; 3rd Generation Partnership Project; Technical Specification Group Core Network and Terminals; IP Multimedia Call Control Protocol Based on Session Initiation Protocol (SIP) and Session Description Protocol (SDP); Stage 3; (Release 8); Dec. 2008; 600 pgs.
Alcatel-Lucent, Verizon Communications; 3GPP TSG-SW WG2 Meeting #70; Title: Support for Non-dialable Callback Number; Change Request; S2-090510; Phoenix, USA; Jan. 12-16, 2009; 3 pgs.
Ericson, 3GPP TSG-SA2 Meeting #56; Title: Temporary Assignment of Emergency Tel URI; Change Request; S2-070153; Florence, Jan. 15-19, 2007; 6 pgs.
QUALCOMM Europe; 3GPP TSG-SA WG2 Meeting #56c; Title: Support of Emergency Public User Tel URIs; Change Request; S2-071230; Warsaw, Poland; Mar. 20-26, 2007; 9 pgs.
Ericson; 3GPP TSG-CT1 Meeting #42bis; Title: Location Handling E-CSCF; Change Request; C1-061158; Montreal, Canada; Jul. 4-7, 2006; 5 pgs.
National Emergency Number Association (NENA); Interim VoIP Architecture for Enchanced 9-1-1-Services (i2); NENA 08-001; Issue 1; Dec. 6, 2005; 181 pgs.
PCT International Preliminary Report on Patentability; PCT Application No. PCT/US10/28021; Apr. 27, 2011; 9 pages.
3GPP TS 23.167 V7.1.0; 3rd Generation Partnership Project; Technical Specification Group Services and System Aspects; IP Multimedia Subsystem (IMS) Emergency Sessions; Release 7; Jun. 2006; 33 pages.
3GPP TS 23.167 V8.3.0; 3rd Generation Partnership Project; Technical Specification Group Services and System Aspects; IP Multimedia Subsystem (IMS) Emergency Sessions; Release 8; Mar. 2009; 36 pages.
3GPP TS 23.167 V8.4.0; 3rd Generation Partnership Project; Technical Specification Group Services and System Aspects; IP Multimedia Subsystem (IMS) Emergency Sessions; Release 8; Jun. 2009; 36 pages.
3GPP TS 23.216 V9.2.0; 3rd Generation Partnership Project; Technical Specification Group Services and System Aspects; Single Radio Voice Call Continuity (SRVCC); Stage 2; Release 9; Dec. 2009; 41 pages.
3GPP TS 23.237 V10.0.0; 3rd Generation Partnership Project; Technical Specification Group Services and Architecture; IP Multimedia Subsystem (IMS) Service Continuity; Stage 2; Release 10; Dec. 2009; 92 pages.
3GPP TR 23.869 V9.0.0; 3rd Generation Partnership Project; Technical Specification Group Services and System Aspects; Support for Internet Protocol (IP) Based IP Multimedia Subsystem (IMS) Emergency Calls Over General Packet Radio Service (GPRS) and Evolved Packet Service (EPS); Release 9; Mar. 2009; 36 pages.
3GPP TR 23.870 V0.3.0; 3rd Generation Partnership Project; Technical Specification Group Services and System Aspects; SR VCC Support for IMS Emergency Calls; Release 9; Feb. 2009; 15 pages.
3GPP TR 23.891 V9.0.0; 3rd Generation Partnership Project; Technical Specification Group Services and System Aspects; Evaluation of LCS Control Plane Solutions for EPS; Release 9; Mar. 2009; 64 pages.
3GPP TS 29.163 V9.0.0; 3rd Generation Partnership Project; Technical Specification Group Core Network and Terminals; Interworking Between the IP Multimedia (IM) Core Network (CN) Subsystem and Circuit Switched (CS) Networks; Release 9; Dec. 2009; 278 pages.
3GPP TSG-SA WG2 Meeting #70; "T-ADS Alignment with T-ADS for SC"; S2-090520; Phoenix, USA; Jan. 12-16, 2009; 4 pages.
3GPP TSG-SA WG2 Meeting #70; "T-ADS Alignment with T-ADS for SC"; S2-090521; Phoenix, USA; Jan. 12-16, 2009; 4 pages.
Schulzrinne, H.; "A Uniform Resource Name (URN) for Emergency and Other Well-Known Services"; RFC 5031; Jan. 2008; 15 pages.
Rosenberg, J., et al.; "SIP: Session Initiation Protocol"; RFC 3261; Jun. 2002; 252 pages.
Donovan, S., et al.; "Session Timers in the Session Initiation Protocol (SIP)"; RFC 4028; Apr. 2005; 28 pages.
Canadian Office Action; Application No. 2,756,722; Jul. 18, 2013; 2 pages.
European Extended Search Report; Application No. 10756644; Jun. 6, 2013; 6 pages.
Canadian Office Action; Application No. 2,756,722; Nov. 27, 2014; 3 pages.

* cited by examiner

SYSTEM AND METHOD FOR PROVIDING A CIRCUIT SWITCHED DOMAIN NUMBER

CROSS-REFERENCE TO RELATED APPLICATIONS

The present application claims priority to U.S. provisional patent application No. 61/162,991 filed Mar. 24, 2009, by John-Luc Bakker, et al, entitled "System and Method for Providing A Circuit Switched Domain Number" (35154-US-PRV-4214-16600), which is incorporated by reference herein as if reproduced in its entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a signaling protocol for creating, modifying, and terminating IMS-based calls or sessions. As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as fixed line telephones, desktop computers, set-top boxes, or network nodes. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent", "UA", "user equipment", "UE", and "node" might be used synonymously herein.

Some UAs communicate in a circuit switched mode, wherein a dedicated communication path exists between two devices. For the duration of a call or session, all data exchanged between the two devices travels along the single path. Some UAs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Communications that take place via circuit switching can be said to occur in the circuit switched domain and communications that take place via packet switching can be said to occur in the packet switched domain.

A user of a UA can typically place an emergency call by dialing 911 (in North America), 112 (in most of Europe), 999 (in the United Kingdom), 110, 118, or 119 (in Japan), or some other emergency-specific number. Such a call may be handled by a Public Safety Answering Point (PSAP), which might be an emergency call center or system that can coordinate an appropriate response to the emergency. Any call made to a PSAP will be referred to herein as an emergency call.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
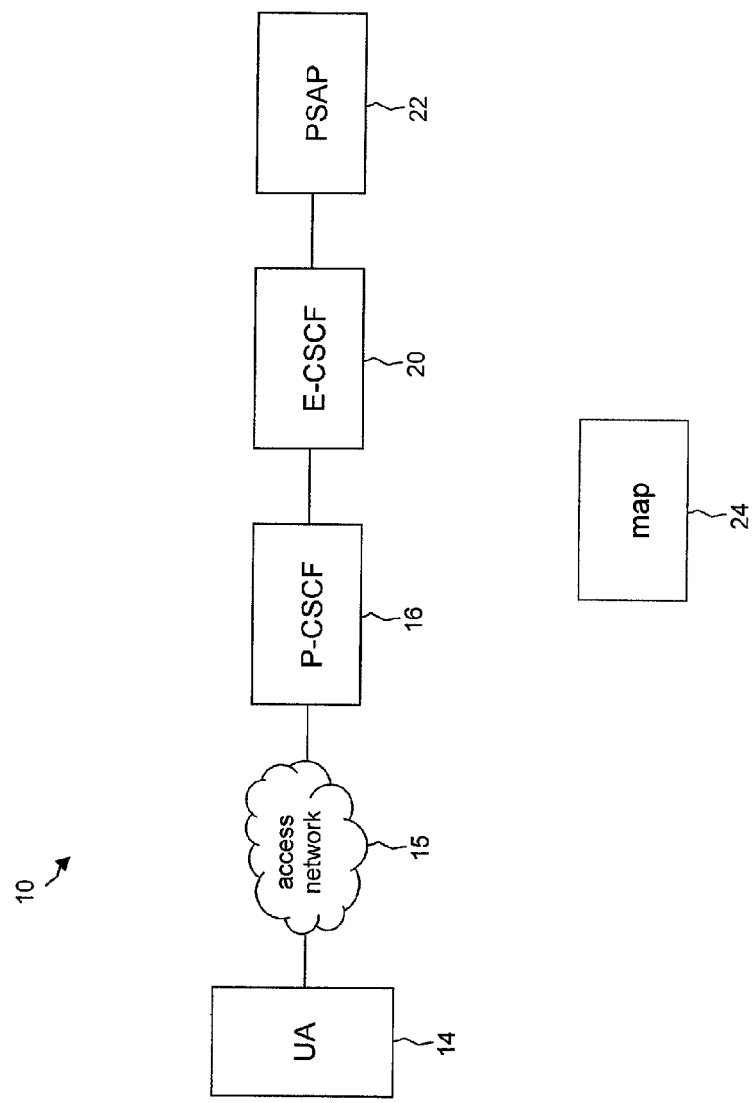
FIG. 1 is a diagram of a system including a UA and a PSAP, according to an embodiment of the disclosure.

FIG. 1 illustrates a system 10 including a UA 14 that communicates via an access network 15 with a P-CSCF (Proxy Call Session Control Function) 16. The access network 15 might be any well known set of components, such as base stations and other radio transmission and reception equipment, that can promote wireless connections to subsequent network components. The P-CSCF 16 is a SIP proxy that may be the first point of contact for the IMS terminal and may be located in the visited network in full IMS networks or in the home network if the visited network is not yet IMS-compliant. The P-CSCF 16 may also be in the user's home network if the UA 14 is not roaming. The P-CSCF 16 communicates with an E-CSCF (Emergency CSCF) 20. The E-CSCF 20 provides session control functions for a PSAP (Public Safety Answering Point) 22, which may be, but is not limited to, a "911" system and could also be "112" or other regional applicable emergency address or number or another emergency call center or system.

To make an emergency or 911 call, the UA 14 might communicate with the PSAP 22 via the P-CSCF 16 and the E-CSCF 20. In some cases there is even a need for an AS (Application Server) to be involved. In addition, other functional elements such as a border gateway or signaling/media gateway may be involved, e.g., when the point of contact of the PSAP is in another domain.

In some cases, the UA 14 might be a packet switched domain-based device, and the PSAP 22 might be a circuit switched domain-based center or system. When a packet switched UA 14 makes an emergency call, an identifier for the UA 14, such as addresses that can be resolved by the IM CN subsystem (IMS) or by SIP, might be associated with the call or session. Examples of such addresses include a GRUU (Globally Routable UA URI (Uniform Resource Identifier)) or SIP URI or tel URI. A circuit switched element that translates the SIP emergency services request into a request routable on a circuit switched network, e.g., a PSAP 22 that is located in a circuit switched network, and that receives such a call might not be able to translate the UA's identifier or addresses that can be resolved by the IM CN subsystem (IMS) or by SIP into an address recognizable or processable by a PSAP 22. However, there may be cases where the circuit switched PSAP 22 needs to identify information related to the packet switched UA 14 that placed the emergency call or may need to be able to identify the emergency call or emergency session or may need to be able to address the UA 14. For example, the PSAP 22 may need to place a callback to the UA 14 for various reasons, the PSAP 22 may need to maintain the UA's location information, or the PSAP 22 may need to store other information related to the UA 14 and/or the emergency call or emergency session placed by the UA 14 so that the information can be retrieved at a later time.

In an embodiment, an association is made between addressing information for the UA 14 that is valid in the packet switched domain and other information that is valid in the circuit switched domain. More specifically, the packet switched address of the UA 14, such as a SIP address or a GRUU, is associated with a temporary E.164 number. In some cases, the E.164 number can take the form of a tel URI or some other type of URI. The tel URI is often conveniently translatable to an address routable or useable in circuit switched network messages and can then be used by the circuit switched PSAP 22. In the absence of a suitable tel URI allocated to UA 14 by, e.g., the home network, a temporary tel URI along with a mapping to identify information associated with the packet switched UA 14 or the emergency call that the UA 14 initiated, can be used. Also, the combination of the address identifying the PSAP 22 and the temporary tel URI can be used to identify information associated with the packet switched UA 14 or the emergency call that the UA 14 initiated. Such a scheme would allow the temporary tel URI to be reused between multiple PSAPs. Other combinations and indications reducing the number of temporary tel URIs able to be assigned are also possible.

In an embodiment, the mapping between the temporary tel URI and the UA's packet switched address is performed by the network in which the UA 14 is currently present. That is, if the UA 14 is in its home network, the home network performs the mapping. If the UA 14 is roaming, the visited network performs the mapping. A map, a mapping, a table, an association, a binding, or some other record of the association between the temporary tel URI and the UA's packet switched address is then maintained in the network that did the mapping. The functionality to perform the mapping and the storage location where the map is maintained could reside in an application server, in the E-CSCF 20, or in other functional elements or combinations of functional elements.

This is illustrated in FIG. 1, where a map 24 associates the UA's packet switched address with an E.164 number. When the PSAP 22 needs to retrieve information related to the UA 14, the PSAP 22 can consult the map 24, find the UA's packet switched address based on the temporary tel URI, and retrieve the information based on the UA's packet switched address. While the map 24 is shown as a separate element, the map 24 could actually reside in one or more of the other components in the system 10 or in one or more other components not shown.

The length of time that the temporary tel URI remains valid can be based on local regulations, network policies, or other appropriate constraints applicable in the home or visited network. After the period of validity for a temporary tel URI has expired, the temporary tel URI is returned to a pool of temporary tel URIs and can be reused to identify or associate with other packet switched-based addresses. Reusing the tel URIs rather than permanently assigning tel URIs can prevent the stock of available (temporary) tel URIs from being depleted.

Under current or proposed procedures, an E.164 number might be assigned to a call at the time of registration, might be assigned only by the home network, and might be assigned for the length of time of the registration. By contrast, in the embodiments described herein, an E.164 number might be assigned to a call only when an emergency call is placed, might be assigned by the home network or visited network, and might be assigned for a length of time greater than or less than the length of time of the registration.

Figure 2:
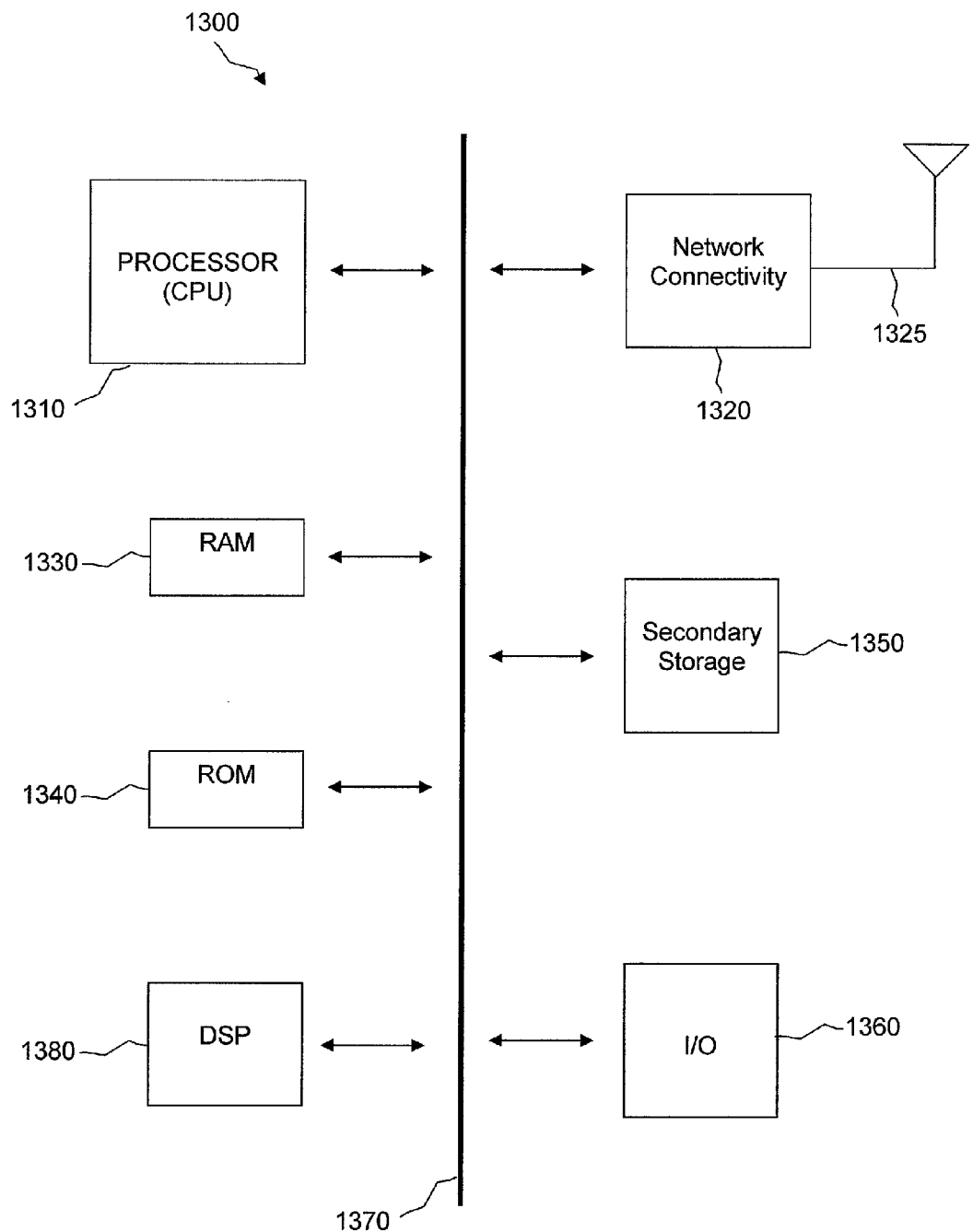
FIG. 2 illustrates a processor and related components suitable for implementing the several embodiments of the present disclosure.

The UA 14 and other components described above might include a processing component that is capable of executing instructions related to the actions described above. FIG. 2 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input or output devices. Also, the transceiver 1325 might be considered to be a component of the I/O devices 1360 instead of or in addition to being a component of the network connectivity devices 1320.

In an embodiment, a method is provided for identifying a device during an emergency for callback. The method includes storing an address of a UA during initiation of an emergency call by the UA, associating an E.164 number with the stored address of the UA that placed the emergency call, and routing the emergency call containing the E.164 number.

In another embodiment, a network component is provided. The network component includes a processor configured to receive an address of a UA during initiation of an emergency call by the UA and to associate the address with an E.164 number, the emergency call being routed to a public safety answering point.

Additional material related to the present disclosure is now provided.

In some jurisdictions (e.g. expressed as local regulations or operator policy (e.g. determined by national regulatory requirements applicable to emergency services)), a routable E.164 number representing the UE that made an emergency call to a PSAP located in the CS domain, must be made available to the PSAP in the CS domain or CS PSAP. In the event the implicitly registered URI does not contain a URI representing an E.164 number uniquely identifying the UE, a network can assign an E.164 number. A network need not assign such a number encoded as a URI if regulatory requirements do not mandate such information.

A PSAP/emergency centre maintains a point of presence in either the IM CN subsystem or the PS domain or the CS domain. The terms PSAP and emergency centre are identical for the purposes of this document.

A UE can make a UE-detected or a non-UE-detected emergency call. If a UE-detected emergency call is made, a UE is required to include a public GRUU if the UE has a public GRUU. Rel-5 or Rel-6 UEs may not have a public GRUU assigned. A Rel-5 or Rel-6 S-CSCF may not assign GRUUs.

If a public GRUU is known to the network (e.g. P-CSCF), then the (visited) network (e.g. S-CSCF) can maintain a relation between the UE's information (such as its GRUU or Contact header field value or P-Asserted-Identity header field value or P-Served-Identity header field value of information identifying the UE) and any assigned tel URI. The relation or associated is maintained for a period of time determined (e.g. using a timer) by regulator policy, local policy, regional policy or operator policy. The period of time or timer can start when the emergency call is terminated or when it is initiated. In some jurisdictions or regions the E.164 number can also be used by the CS PSAP to attempt a call back. The E.164 number or CS domain routable number may be used to retrieve location or logging information, e.g. as a key.

Embodiments of five alternative solutions are now provided to address these issues.

In a first solution, the E-CSCF allocates an E.164 number that is used as a PSI (PSI is defined in 3GPP TS 23.228 and 3GPP TS 24.229) in the event the CS PSAP makes a call back. The E-CSCF then correlates. The PSI correlation is valid until it expires; the expiration time can be set according to an operator's policy driven by e.g. regulatory requirements. The PSI number can also be used to identify location information from the LRF. In the following steps of this first solution, it is assumed that the UE has successfully registered in IMS.

Step 1: UE sends a request to a P-CSCF.

Step 2: P-CSCF (also) determines the request is an emergency services request, fails to assign a correct P-Asserted-Identity header field or P-Served-Identity header field set to a tel URI.

Step 3: the local or visited network's E-CSCF determines no tel URI (or URI with other URI scheme representing an E.164 number, e.g. SIP URI with user set to "phone") was assigned and assigns one from a pool. Each PSAP could have a pool associated. The request is assigned a "PSAP URI" in its R-URI (a PSAP URI may be an E.164 number identifying the PSAP). The LRF may provide this PSAP URI. The LRF may also provide other information further elaborated in 3GPP TS 23.167 and 3GPP TS 24.229.

Step 4: eventually, a PSAP in the CS Domain receives the IAM (assuming the point of presence for the selected identified by the PSAP URI is in the CS Domain).

Step 5: at some point, either following normal procedures of e.g. due to network connections or other events, the call with the PSAP in the CS Domain is disconnected Step 6: for some reason, the PSAP in the CS Domain initiates a call back Step 7: an MGCF in the visited network receives the IAM from PSAP in the CS Domain and forwards it to an S-CSCF or I-CSCF. The S/I-CSCF is configured to route the request to a functional element hosting the PSI (e.g. E-CSCF or some AS or other).

Step 8: The functional element hosting the PSI maintains a binding with the public GRUU or with the SIP URI originally received in the emergency services request. The functional element hosting the PSI performs third party call setup towards preferably the GRUU (preferably the Public GRUU) or other UE identifying information (such as P-Asserted-Identity header field value or P-Preferred-Identity header field value or P-Served-User header field value or Contact header field value or From header field value of other). Further steps are omitted for brevity.

In the event in the particular jurisdiction privacy is allowed, it should be possible to prevent location information to be correlated or even to prevent a call back to be made, depending on operator policy driven e.g. regulatory requirements. In such a case, the P-Asserted-Identity header field value could be set to some non-dialable E.164 number.

Figure 3:
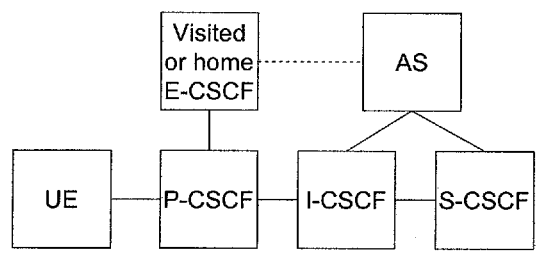
FIG. 3 illustrates an architecture enabling a network to assign a PSI tel URI to an emergency services request, according to an embodiment of the disclosure.

FIG. 3 presents an architecture alternative enabling a network to assign an emergency services request a PSI tel URI when this is needed and complete a session to a UE address associated with a PSI if the PSI is routed too. The E-TEL-PSI AS is conveniently introduced for this purpose. Any (one or more) functional element including an AS capable of hosting PSIs could perform this function or capable to perform relation maintaining functions such translating PSIs into UE identifying information or capable of routing to the UE or UEs identified by the UE identifying information (e.g. using forking or e.g. using 3rd party call control). In this embodiment, the E-CSCF routes emergency services requests conditionally to an E-TEL-PSI AS. In the architecture of FIG. 3, the dashed line is new in Rel-7 and Rel-8. The elements in the figure are all situated either in the home network or in the visited network.

It should be noted that an E-SCC AS (per 3GPP TR 23.870) can also assign a PSI tel URI e.g. for the purposes of a call back or for accessing logging information after an emergency call was terminated, etc. The E-CSS AS would then in addition to performing the E-TEL-PSI AS functions perform the E-SCC AS functions. The E-SCC+E-TEL-PS AS will then have to maintain, for as long as the PSI associated to the P-Asserted-Identity value or public GRUU hasn't expired, that the UE represented by the P-Asserted-Identity value or public GRUU is SC UE. Below it will be demonstrated that E-TEL-PSI AS functions can be distributed over different nodes, such as e.g. ECS, E-CSCF, LRF, etc. In such cases, a suitable interworking between E-SCC AS and the distributed functions of the E-TEL-PSI AS may need to be found. E.g. the PSI allocated in the E-TEL-PSI AS or the GRUU or P-Asserted-Identity value or other UE(s) identifying information present in the original INVITE requesting emergency services, could be passed to E-SCC AS for anchoring.

The E-TEL-PSI AS or E-CSCF may also log details of the calling subscriber and UE along with the current date and time associated with the assigned PSI tel URI for the purposes of future investigative analysis by authorities into whom and from which UE and the location where the emergency call was placed at this particular date and time that corresponds to the particular E.164 number that was presented to the PSAP. This information may be useful after the PSI tel URI has been reallocated. Details of the calling subscriber and UE logged may include the public user identity (e.g. SIP URI, tel URI, uri of other scheme (e.g. HTTP or even "urn") or even non routable.dial-able (tel) URI) used by the user to place the Emergency call (as provided in e.g. the P-Asserted-Identity header field of the initial INVITE), the Public or Temporary GRUU if present in the Contact header of the initial INVITE, the IMEI or other value contained in the SIP.instance parameter for that UE (obtained either from the SIP.Instance parameter included in the Contact header in the SIP REGISTER request at registration or derived from the Public or Temporary GRUU if present in the Contact header of the initial INVITE), and any location information contained in the initial INVITE request (e.g. Cell ID) or obtained from a location server (e.g. Geographic coordinates) (or obtained from a location URI) for the emergency call, as specified in 3GPP TS 24.229.

The E-CSCF shall provide the procedures for the insertion of the E-TEL-PSI AS into the signaling path of an IMS emergency call. In addition, according to 3GPP TS 23.167, if the UE does not have credentials, a non-dialable callback number shall be derived where required by local regulation (e.g. see Annex C of J STD 036).

The E-TEL-PSI AS shall provide the procedures for AS hosting PS's and 3PCC. The E-TEL-PSI AS acts as a routing B2BUA which invokes third party call control (3pcc) for completion of any calls routed to a PSI hosted on the AS. Standard SIP procedures and CS procedures may be utilized to carry out processing of the call back. Below is an example of the mapping used to correlate the two (2) SIP Invite messages:

The network node dynamically allocates (or uses some algorithm such a sequential, random, etc.) or otherwise identifies a PSI or IP multimedia routing number (IMRN) (e.g. the E.164 number) from a pool/range/group of IMRNs, and produces a stored mapping of the selected IMRN to the identification of the UE device. This identification could be but is not limited to: Private User Identity, Public User Identities, Mobile Equipment Identifier, etc. An example of how this information is stored in the network node is provided below:
 [PSI hosted on the node (i.e. E.164 number), Timer value]
 Private User Identity received in the registration IMPI, IMSI, MIN
 Public User Identity Registered IMPU, MSISDN etc
 Implicit Public User IDs registered
 Contact address
 Public GRUUs and Temporary GRUUs for all these registered IMPUs
 gr parameter e.g. a mobile equipment Identifier Here, the E.164 number is used as a reference, and stored against it is a number of parameters as received in SIP Register message. A timer may be initialized with a timer value and started at the network node for monitoring the time period over which the IMRN remains assigned to the UE device (i.e. after timer expiration, the selected IMRN may be deassigned from the UE device and released back into the pool/group/range of IMRNs).

The E.164 numbers may in a particular embodiment be allocated from a distributed database which also stores the associated mappings, that can be accessed by multiple E-TEL-PSI AS's or E-CSCFs allowing any E-TEL-PSI AS's or E-CSCFs to access the database and obtain the E.164 numbers and their mappings. In a particular embodiment the distributed database could be the HSS or in an alternate embodiment it could be a separate database for this purpose.

Figure 4:
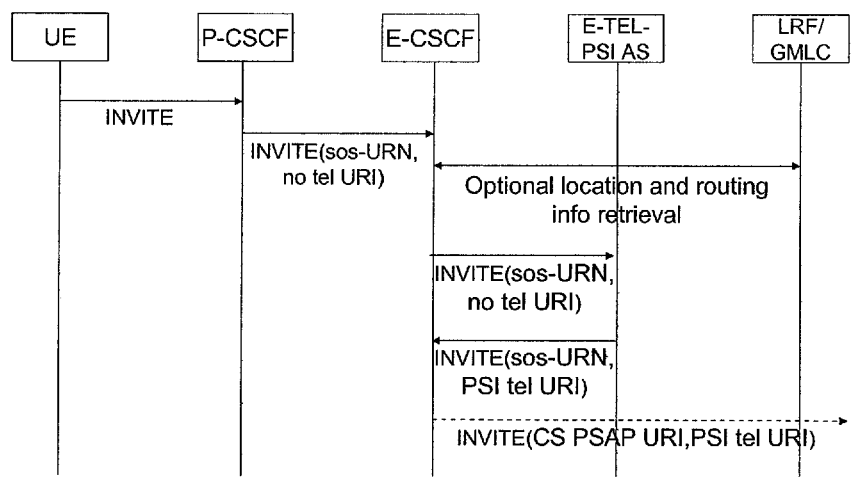
FIG. 4 illustrates a UE initiating an emergency session in IMS, according to an embodiment of the disclosure.

FIG. 4 provides an example flow for an emergency session established in IMS, illustrating how the emergency session request receives a PSI in the form of a tel URI. The following steps occur in FIG. 4.

1. The UE initiates an IMS emergency session and the procedures defined in TS 23.167. This involves the UE generating a SIP INVITE containing the UE's location information.
2. The P-CSCF selects an E-CSCF and forwards the INVITE to the E-CSCF. The P-CSCF fails to include an asserted identity in the form of a tel URI.
3. The E-CSCF sends a request to the LRF sends the INVITE to the LRF to obtain UE location information (if not provided in the INVITE), selects the most appropriate PSAP based on the UE's location and allocates the necessary correlation information and routing information for the call.

4. The E-CSCF sends the INVITE to a E-TEL-PSI AS. The decision to route to the E-Tel-PSI AS can be based upon operator policy and could include but is not limited to:
 if no asserted tel URI is presented
 a Tel URI is present but a local Tel URI is required by the PSAP.

Such determination could be dynamically configured, e.g. using means substantially similar as iFC, examining if no Tel URI is present in the P-Asserted-Identity field.

Upon receipt of the SIP INVITE at the E-TEL-PSI-AS a Tel URI shall be obtained/chosen/dynamically assigned. A binding shall be created between this Tel URI and the information received in the SIP INVITE. The time that this binding is held is operator configurable. This binding could include the whole contents of the SIP INVITE or partial information such as but not limited to: P-ASSERTED-ID, Contact Head, From Header etc. Note a Binding means that the information is stored in a database either internally or externally (could be distributed).

The E-TEL-PSI AS allocates a PSI which takes the form of a tel URI and retains the public GRUU or Public User Identity present in the received request. The public GRUU or Public User Identity and their association with the PSI are retained for an operator configurable period of time. A BINDING or relation or association IS CREATED BETWEEN THE TEL URI AND THE RECEIVED IDENTITIES: Tel URI→CONTACT HEADER or P-Asserted-Identity header field or other UE identifying information. For example, the PSI eventually added ADDED or INSERTED as a From or P-Asserted-Identity or P-served-User header field value. The E-TEL-PSI AS or E-CSCF or network could decide to include a PSI due to absence of something routable or something unique in the CS PSAP domain or, more general, target domain where the PSAP has its point of presence. It is another advantage that e.g. CS PSAP only is enabled to or identify the emergency call with an address according to a local numbering plan or limited to other regional constraints from a uniqueness perspective (e.g. several CS PSAPs may have the same pool with E.164 numbers when accessing emergency call or session related details; the combination of PSAP URI and tel URI used to e.g. identify the logging or location or call back details, makes the emergency call uniquely identifiable from a receiving PSAP's perspective). In case call back is supported, the CS PSAP is enabled to dial a local number even if tel URI is present but not local.

5. The E-TEL-PSI AS sends the request on behalf of a PSI that is hosted by the AS and sends it back to E-CSCF (per PSI procedures specified e.g. in 3GPP).

6. The E-CSCF uses the routing information to format the INVITE message, and it sends it directly to the PSAP, or to the PSAP via the MGCF.

Figure 5:
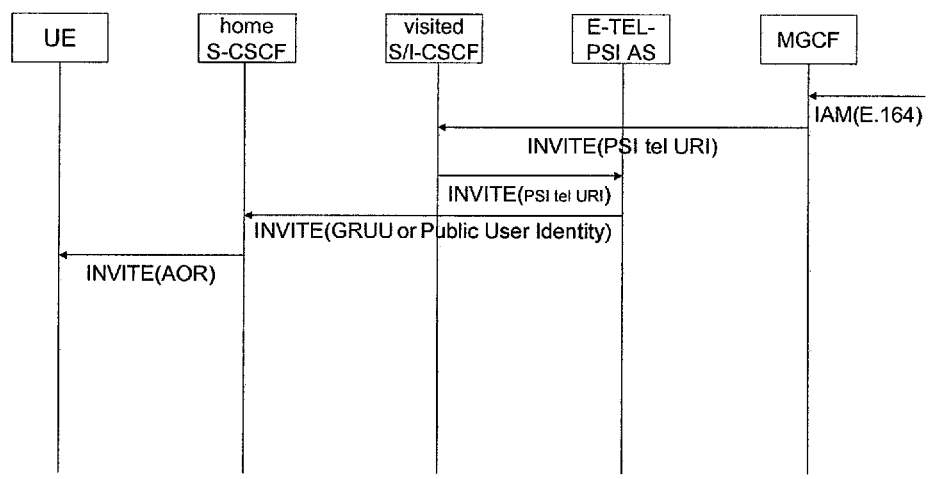
FIG. 5 illustrates a CS PSAP initiating a call back to a UE identified by its PSI tel URI, according to an embodiment of the disclosure.

FIG. 5 provides an example flow for a CS PSAP call back established in IMS using PSI tel URI assigned in FIG. 4. Not all functional elements are shown. The following steps occur in FIG. 5.

1. The MGCF receives a IAM with a E.164 number.
2. The I-CSCF or S-CSCF recognizes the E.164 number as a PSI and routes it to the AS hosting the PSI.
3. The E-TEL-PSI AS uses the PSI to determine the public GRUU or Public User Identity association with the PSI. The E-TEL-PSI AS performs 3pcc.
4. The E-TEL-PSI AS originates an INVITE towards the GRUU or Public User Identity associated with the PSI.
5. The Home S-CSCF eventually routes the INVITE to the UE.

The following examples detail proposed stage 3 changes to draft-24.229-860 and some CRs:

5.2.10 Emergency service 5.2.10.2 General treatment for all dialogs and standalone transactions excluding the REGISTER method—requests from an unregistered user If the P-CSCF receives an initial request for a dialog or standalone transaction, or an unknown method from an unregistered user on the IP address and the unprotected port advertised to the UE during the P-CSCF discovery or the SIP default port, the P-CSCF shall inspect the Request-URI independent of values of possible entries in the received Route header fields for known emergency service identifiers, i.e. emergency numbers and the emergency service URN from the configurable lists.

If the P-CSCF detects that the Request-URI of the initial request for a dialog or standalone transaction, or unknown method matches one of the emergency service identifiers in any of these lists, the P-CSCF shall:

1) include in the Request-URI an emergency service URN, i.e. a service URN with a top-level service type of "sos" in accordance with RFC 5031[69]. An additional sub-service type can be added if information on the type of emergency service is known. The entry in the Request-URI that the P-CSCF includes may either be:
 as received in the Request-URI from the UE in accordance with RFC 5031[69]; or
 as deduced from the Request-URI received from the UE;

1A) include the "sos" URI parameter in the Contact header field that indicates that this is an emergency session, as described in draft-patel-ecrit-sos-parameter [159], if not already present;

2) select an E-CSCF and add the URI of the selected E-CSCF to the topmost Route header field;

NOTE: How the list of E-CSCF is obtained by the P-CSCF is implementation dependent.

3) execute the procedure described in subclause 5.2.6.3.3, subclause 5.2.6.3.7, subclause 5.2.6.3.11 and subclause 5.2.7.2, as appropriate except for:
 verifying the preloaded route against the received Service-Route header field;
 removing the P-Preferred-Identity header field;
 inserting a P-Asserted-Identity header field;
 including the initiator of the request in the P-Served-User header field as specified in draft-vanelburg-sipping-served-user [133]; and 4) insert an indication that the P-CSCF supports the keep-alive mechanism defined in draft-holmberg-sip-keep [143].

[ . . . ]

5.2.10.3 General treatment for all dialogs and standalone transactions excluding the REGISTER method after emergency registration If the P-CSCF receives an initial request for a dialog, or a standalone transaction, or an unknown method, for a registered user over the security association, TLS session, or IP association that was created during the emergency registration, the P-CSCF shall inspect the Request-URI independent of values of possible entries in the received Route header fields for known emergency service identifiers, i.e. emergency numbers and the emergency service URN from these configurable lists.

If the P-CSCF detects that the Request-URI of the initial request for a dialog, or a standalone transaction, or an unknown method does not match any one of the emergency service identifiers in any of these lists, the P-CSCF shall reject the request by returning a 403 (Forbidden) response to the UE.

If the P-CSCF detects that the Request-URI of the initial request for a dialog, or a standalone transaction, or an unknown method matches one of the emergency service identifiers in any of these lists, the P-CSCF shall:

1) include in the Request-URI an emergency service URN, i.e. a service URN with a top-level service type of "sos" as specified in RFC 5031[69], if necessary, and execute the procedure described in step 4, 5, 6, and 7, in subclause 5.2.6.3.3, subclause 5.2.6.3.7, subclause 5.2.6.3.11 and subclause 5.2.7.2, as appropriate. An additional sub-service type can be added if information on the type of emergency service is known. The entry in the Request-URI that the P-CSCF includes may either be:
   as received from the UE in the Request-URI in accordance with RFC 5031[69]; or
   as deduced from the Request-URI received from the UE.
1A) include the "sos" URI parameter in the Contact header field that indicates that this is an emergency session, as described in draft-patel-ecrit-sos-parameter [159], if not already present;
2) if the request contains a Contact header field containing a GRUU the P-CSCF shall save the GRUU received in the Contact header field of the request and associate it with the UE IP address and UE port such that the P-CSCF is able to route target refresh request containing that GRUU in the Request-URI. The UE port used for the association is determined as follows:
   if IMS AKA or SIP digest with TLS is being used as a security mechanism, the UE protected server port for the security association on which the request was received; or
   if SIP digest without TLS, NASS-IMS bundled authentication or GPRS-IMS-Bundled Authentication is being used as a security mechanism, the UE unprotected port on which the request was received.

In addition the P-CSCF shall execute the procedures as specified in subclause 5.2 with the following additions:

3) the P-CSCF shall:
   if the public user identity included in the P-Preferred-Identity header field matches one of the registered public user identities, remove any P-Preferred-Identity header field or P-Asserted-Identity header field from the received request and insert a P-Asserted-Identity header field that includes the public user identity that was present in the received P-Preferred-Identity header field or P-Asserted-Identity header field. In addition:
   a) if a tel URI is associated with the public user identity, add a second P-Asserted-Identity header field that contains the tel URI associated with the public user identity;
   b) a tel URI is not associated with the public user identity, then do nothing;
   Contributor's note: <do nothing, i.e. don't include a PAI set to a tel URI and let the E-CSCF sort it since the "P-Asserted-Identity header field that includes the public user identity that was present in the received P-Preferred-Identity header field or P-Asserted-Identity header field" is already inserted above>
   c) If the tel URI associated with one of the registered public user identities is included in the header field received in the request, check the validity of the tel URI, remove the received header field and insert a P-Asserted-Identity header field that includes the tel URI that was present in the received header field. Add a second P-Asserted-Identity header field that contains a public user identity associated with the tel URI.
   Contributor's note: The procedures must foresee in maximally assigning two P-Asserted-Identity header field values according to the "P-Asserted-Identity RFC" referenced in this version of 3GPP TS 24.229.
   d) if a tel URI is included in the header field received in the request that is not associated with one of the registered public user identities;
   Contributor's note: <do nothing, i.e. don't include a PAI set to a tel URI and let the E-CSCF sort it>
   select an E-CSCF and add the URI of the selected E-CSCF to the topmost Route header field.
   NOTE: It is implementation dependant as to how the P-CSCF obtains the list of E-CSCFs.

If the P-CSCF does not receive any response to the INVITE request (including its retransmissions); or receives a 3xx response or 480 (Temporarily Unavailable) response to an INVITE request, the P-CSCF shall select a new E-CSCF and forward the INVITE request.

When the P-CSCF receives a target refresh request for a dialog with the Request-URI containing a GRUU the P-CSCF shall:
   obtain the UE IP address and UE port associated to the GRUU contained in the Request-URI and rewrite the Request-URI with that UE IP address and UE port; and
   perform the steps in subclause 5.2.6.4.5 for when the P-CSCF receives, destined for the UE, a target refresh request for a dialog.

5.2.10.4 General treatment for all dialogs and standalone transactions excluding the REGISTER method—non-emergency registration If the P-CSCF receives an initial request for a dialog, or a standalone transaction, or an unknown method, for a registered user, and the request is not understood from saved or included information to relate to private network traffic (see subclause 5.2.6.3), the P-CSCF shall inspect the Request-URI independent of values of possible entries in the received Route header fields for known emergency service identifiers, i.e. emergency numbers and the emergency service URN from these configurable lists. If the P-CSCF detects that the Request-URI of the initial request for a dialog, or a standalone transaction, or an unknown method matches one of the emergency service identifiers in any of these lists, the P-CSCF shall:

0) determine the geographical location of the UE. Access technology specific procedures are described in each access technology specific annex. If the UE is roaming or the P-CSCF is in a different network than the UE's home operator's network, then the P-CSCF:
   shall reject the request by returning a 380 (Alternative Service) response to the UE;
   shall assume that the UE supports version 1 of the XML Schema for the 3GPP IM CN subsystem XML body if support for the 3GPP IM CN subsystem XML body as described in subclause 7.6 in the Accept header field is not indicated; and shall include in the 380 (Alternative Service) response:
a Content-Type header field with the value set to associated MIME type of the 3GPP IM CN subsystem XML body as described in subclause 7.6.1; and
a P-Asserted-Identity header field set to the value of the SIP URI of the P-CSCF included in the Path header field during the registration of the user whose UE sent the request causing this response.

The body shall contain:
a) an <alternative-service> element, set to the parameters of the alternative service;
b) a <type> child element, set to "emergency" to indicate that it was an emergency call;
c) a <reason> child element, set to an operator configurable reason; and
d) an <action> child element, set to "emergency-registration" if the request included an emergency service URN in the Request-URI.

NOTE 1: Roaming is when a UE is in a geographic area that is outside the serving geographic area of the home IM CN subsystem.

NOTE 2: Emergency service URN in the request-URI indicates for the network that the emergency call attempt is recognized by the UE.

1) include in the Request-URI an emergency service URN, i.e. a service URN with a top-level service type of "sos" as specified in RFC 5031[69], if necessary, and execute the procedure described in step 3, 4, 5, 6, and 7, in subclause 5.2.6.3.3, subclause 5.2.6.3.7, subclause 5.2.6.3.11 and subclause 5.2.7.2, as appropriate. An additional sub-service type can be added if information on the type of emergency service is known. The entry in the Request-URI that the P-CSCF includes may either be:
as received from the UE in the Request-URI in accordance with RFC 5031[69]; or
as deduced from the Request-URI received from the UE; and 1A) include the "sos" URI parameter in the Contact header field that indicates that this is an emergency session, as described in draft-patel-ecrit-sos-parameter [159], if not already present;

2) if the request contains a Contact header field containing a GRUU the P-CSCF shall save the GRUU received in the Contact header field of the request and associate it with the UE IP address and UE port such that the P-CSCF is able to route target refresh request containing that GRUU in the Request-URI. The UE port used for the association is determined as follows:
if IMS AKA or SIP digest with TLS is being used as a security mechanism, the UE protected server port for the security association on which the request was received; or
if SIP digest without TLS is being used as a security mechanism, the UE unprotected port on which the request was received.

In addition the P-CSCF shall execute the procedures as specified in subclause 5.2 with the following additions:
3) the P-CSCF shall:
if the public user identity included in the P-Preferred-Identity header field matches one of the registered public user identities, remove any P-Preferred. Identity header field or P-Asserted-Identity header field from the received request and insert a P-Asserted-Identity header field that includes the public user identity that was present in the received P-Preferred-Identity header field or P-Asserted-Identity header field. In addition:
a) if a tel URI is associated with the public user identity, add a second P-Asserted-Identity header field that contains the tel URI associated with the public user identity;
b) a tel URI is not associated with the public user identity, <do nothing, i.e. don't include a PAI set to a tel URI and let the E-CSCF sort it since the "P-Asserted-Identity header field that includes the public user identity that was present in the received P-Preferred-Identity header field or P-Asserted-Identity header field" is already inserted above>
c) if the tel URI associated with one of the registered public user identities is included in the header field received in the request, check the validity of the tel URI, remove the received header field and insert a P-Asserted-Identity header field that includes the tel URI that was present in the received header field. Add a second P-Asserted-Identity header field that contains a public user identity associated with the tel URI. The essence is that a P-CSCF can recognize it cannot assign a (unique tel URI and in such a case leave it to the E-CSCF procedures as drafted below);
d) if a tel URI is included in the header field received in the request that is not associated with one of the registered public user identities, <do nothing, i.e. don't include a PAI set to a tel URI and let the E-CSCF sort it>
select an E-CSCF and add the URI of the selected E-CSCF to the topmost Route header field.

NOTE 3: It is implementation dependant as to how the P-CSCF obtains the list of E-CSCFs.

If the P-CSCF does not receive any response to the INVITE request (including its retransmissions); or receives a 3xx response or 480 (Temporarily Unavailable) response to an INVITE request, the P-CSCF shall select a new E-CSCF and forward the INVITE request.

When the P-CSCF receives a target refresh request for a dialog with the Request-URI containing a GRUU the P-CSCF shall:
obtain the UE IP address and UE port associated to the GRUU contained in the Request-URI and rewrite the Request-URI with that UE IP address and UE port; and
perform the steps in subclause 5.2.6.4 for when the P-CSCF receives, destined for the UE, a target refresh request for a dialog.

5.11 Procedures at the E-CSCF
5.11.2 UE originating case

The E-CSCF may either forward the call to a PSAP in the IP network or forward the call to a PSAP in the PSTN. In the latter case the call will pass a BGCF and a MGCF before entering the PSTN.

Upon receipt of an initial request for a dialog, or a standalone transaction, or an unknown method including a Request-URI with an emergency service URN, i.e. a service URN with a top-level service type of "sos" as specified in RFC 5031 [69], or an emergency number the E-CSCF shall:
1) remove its own SIP URI from the topmost Route header field;
2) if the PSAP is the next hop, store the value of the "icid-value" header field parameter received in the P-Charging-Vector header field and remove the received information in the P-Charging-Vector header field, else keep the P-Charging-Vector if the next hop is an exit IBCF or a BGCF;

3) if the PSAP is the next hop remove the P-Charging-Function-Addresses header fields, if present, else keep the P-Charging-Function-Addresses header fields if the next hop is an exit IBCFor a BGCF;
4) if an IBCF or BGCF is the next hop insert a type 2 "orig-ioi" header field parameter into the P-Charging-Vector header field. The E-CSCF shall set the type 2 "brig-ioi" header field parameter to a value that identifies the sending network. The E-CSCF shall not include the "term-ioi" header field parameter;
5) get location information as
   geographical location information received as a location object from a message body with the content type application/pidf+xml in accordance with draft-ietf-sip-location-conveyance [89]; and
   location identifier as derived from the P-Access-Network-Info header field, if available.
NOTE 1: The E-CSCF can request location information from an LRF. The protocol used to retrieve the location information from the LRF is not specified in this version of the specification.
NOTE 2: As an alternative to retrieve location information from the LRF the E-CSCF can also request location information from an external server. The address to the external server can be received in the Geolocation header field as specified in draft-ietf-sip-location-conveyance [89]. The protocol used to retrieve the location information from the external server is not specified in this version of the specification.
6) select, based on location information and optionally type of emergency service:
   a PSAP connected to the IM CN subsystem network and add the PSAP URI to the topmost Route header field; or
NOTE 3: If the user did not request privacy or if national regulator policy applicable to emergency services does not require the user be allowed to request privacy, the E-CSCF conveys the P-Access-Network-Info header field containing the location identifier, if defined for the access type as specified in subclause 7.2A.4, to the PSAP.
   a PSAP in the PSTN, add the BGCF URI to the topmost Route header field and add a PSAP URI in tel URI format to the Request-URI with an entry used in the PSTN/CS domain to address the PSAP;
NOTE 4: If the user did not request privacy or if national regulator policy applicable to emergency services does not require the user be allowed to request privacy, the E-CSCF conveys the P-Access-Network-Info header field containing the location identifier, if defined for the access type as specified in subclause 7.2A.4, towards the MGCF. The MGCF can translate the location information if included in INVITE (i.e. both the geographical location information in PIDF-LO and the location identifier in the P-Access-Network-Info header field) into ISUP signaling, see 3GPP TS 29.163[11B].
NOTE 5: The E-CSCF can request location information and routing information from the LRF. The E-CSCF can for example send the location identifier to LRF and LRF maps the location identifier into the corresponding geographical location information that LRF sends to E-CSCF. The LRF can invoke an RDF to convert the location information into a proper PSAP/EC URI. Both the location information and the PSAP URI are returned to the E-CSCF.
NOTE 6: The way the E-CSCF determines the next hop address when the PSAP address is a tel URI is implementation dependent.
7) if the user did not request privacy or if national regulator policy applicable to emergency services does not require the user be allowed user to request privacy, and if the E-CSCF receives a reference number from the LRF the E-CSCF shall include the reference number in the P-Asserted-Identity header field;
NOTE 7: The reference number is used in the communication between the PSAP and LRF.
8) if due to local policy or if the PSAP requires interconnect functionalities (e.g. PSAP address is of an IP address type other than the IP address type used in the IM CN subsystem), put the address of the IBCF to the topmost Route header field, in order to forward the request to the PSAP via an IBCF in the same network;
9) create a Record-Route header field containing its own SIP URI;
10) if the request is an INVITE request, save the Contact, Cseq and Record-Route header field values received in the request such that the E-CSCF is able to release the session if needed;
11) if:
   no P-Asserted-Identity header field is present or if no P-Served-User header field is present and if required by operator policy (e.g. determined by national regulatory requirements applicable to emergency services) (e.g. see Annex C of J STD 036 [abc]), insert P-Asserted-Identity header field set to a non-dialable callback number; or
   privacy is not requested or if operator policy (e.g. determined by national regulatory requirements applicable to emergency services) does not allow requests for suppression of public user identifiers and location information per 3GPP TS 22.101[1A], if no P-Asserted-Identity header field contains a tel URI and if operator policy permits, route the call to a E-TEL-PSI-AS; otherwise
   route the request based on SIP routing procedures.
NOTE 8: Depending on local operator policy, the E-CSCF has the capability to reject requests relating to specific methods in accordance with RFC 3261[26], as an alternative to the functionality described above.

Upon receipt of an initial request for a dialog, a standalone transaction, or an unknown method from the E-TEL-PSI-AS, the E-CSCF shall route the request based on SIP routing procedures.

Upon receipt of an initial request for a dialog, a standalone transaction, or an unknown method, that does not include a Request-URI with an emergency service URN or an emergency number, the E-CSCF shall reject the call by sending a 403 (Forbidden) response.

When the E-CSCF receives the request containing the access-network-charging-info parameter in the P-Charging-Vector, the E-CSCF shall store the access-network-charging-info parameter from the P-Charging-Vector header field. The E-CSCF shall retain access-network-charging-info parameter in the P-Charging-Vector header field.

When the E-CSCF receives any request or response (excluding ACK requests and CANCEL requests and responses) related to a UE-originated dialog or standalone transaction, the E-CSCF may insert previously saved values into P-Charging-Vector and P-Charging-Function-Addresses header fields before forwarding the message.

When the E-CSCF receives any 1xx or 2xx response related to a UE-originated dialog or standalone transaction, the E-CSCF shall remove any P-Preferred-Identity header field, and insert a P-Asserted-Identity header field with the digits that can be recognized as a valid emergency number if dialed as a tel URI representing the number, before forwarding the message.

> NOTE 9: Numbers that can be recognized as valid emergency numbers if dialed by the user are specified in 3GPP TS 22.101[1A]. The emergency numbers 112 and 911 are stored on the ME, in accordance with 3GPP TS 22.101[1A].

When the E-CSCF receives an INVITE request from the UE, the E-CSCF may require the periodic refreshment of the session to avoid hung states in the E-CSCF. If the E-CSCF requires the session to be refreshed, the E-CSCF shall apply the procedures described in RFC 4028[58] clause 8.

> NOTE 10: Requesting the session to be refreshed requires support by at least the UE or the PSAP or MGCF. This functionality cannot automatically be granted, i.e. at least one of the involved UAs needs to support it in order to make it work.

5.12 Procedures at the E-TEL-PSI-AS 5.12.1 Receiving a request absent of a P-Asserted-Identity header field containing a tel URI Upon receipt of an initial request for a dialog, or a standalone transaction, or an unknown method including a Request-URI with an emergency service URN, i.e. a service URN with a top-level service type of "sos" as specified in RFC 5031[69], or an emergency number, without a P-Asserted-Identity header field containing a tel URI, the E-TEL-PSI-AS shall:

- correlate a tel URI with the public GRUU value in the Contact header field. If the public GRUU is not present in the Contact header field, correlate a tel URI with the P-Asserted-Identity header field value.
- maintain a timer which, upon expiry, removes the correlation;
- originate a request on behalf of the PSI according to procedures in subclause 5.7.3.

5.12.2 Receiving a request for a hosted PSI

Upon receipt of an initial request for a dialog for a PSI hosted by the E-TEL-PSI-AS, the E-TEL-PSI-AS shall:

- determine the public GRUU or public user identity value, correlated with the PSI received in the Request-URI;
- originate a request towards the GRUU or public user identity value.

In an alternative embodiment of the first solution, the E-TEL-PSI AS functionality discussed above with regard to the first embodiment of the first solution could also be implemented internally in the E-CSCF.

The E-CSCF may need a reference point between the HSS implementing at least a subset of Sh. In addition the address of the E-CSCF may need to be configured in the I/S-CSCF as serving PSIs.

Procedures in subclause 5.11 might be merged with subclause 5.12 as proposed above. In addition, the following text may need to be added to subclause 5.11:

When sending an initial request on behalf of a PSI that is hosted by the E-CSCF, the E-CSCF shall:

- insert a P-Asserted-Identity containing the PSI;
- if the E-CSCF is not able to resolve the next hop address by itself or the operator policy does not allow it, insert a Route header field pointing either to the S-CSCF where the PSI is hosted, or to the entry point of the home network of the PSI or to the transit function. The E-CSCF shall append the "orig" parameter to the URI in the topmost Route header field; and > NOTE 3: The address of the E-CSCF hosting the PSI can be obtained by querying the HSS on the Sh interface.

> NOTE 4: E-CSCF can only send the initial request to the entry point of the home network of the PSI only if the E-CSCF can assume (e.g. based on local configuration) that the receiving entry point will be able to process the request as an originating request.

- if the E-CSCF is able to resolve the next hop address by itself and the operator policy allows it, forward the originating request directly to the destination without involving any S-CSCF in the originating IM CN subsystem.

Further text performing 3pcc AS functionality may be merged with subclause 5.11.

In another alternative embodiment of the first solution, the E-CSCF or E-TEL-PSI AS allocates the PSI to be used for a call back and hands it to the LRF. The LRF then returns an ESQK (e.g. in North America) or location number (e.g. in EU) or reference number to the E-CSCF. According to 3GPP TS 23.167, the ESQK is used by the PSAP to query the LRF for location information and optionally a callback number. If the LRF provides an ESQK to the IMS network assigns any other dedicated resource to the emergency session, the IMS network shall inform the LRF when the session is released in order to allow the LRF to release this resource. Typically, the session is released prior to expiry of the allocated PSI in e.g. the E-TEL-PSI AS. If the session is not released when the PSI expires, the allocated PSI should not be released.

In particular, the information provided by the LRF to the E CSCF (e.g. ESQK) shall then include correlation information identifying both the LRF and the emergency session record in the LRF. This correlation information shall be transferred to the PSAP during session establishment (e.g. in a SIP INVITE or via SS7 ISUP signaling from the MGCF). The PSAP may use this information to request an initial location estimate from the LRF and/or to request an updated location estimate.

The Emergency Service Query Key (ESQK) is a 10-digit North American Numbering Plan number used to identify a particular emergency call instance. It is used by the LRF as a key to look up for the location information and callback information associated with the emergency call instance and is also used by the PSAP to query location information from the LRF (see 3GPP TS 23.167).

Figure 6:
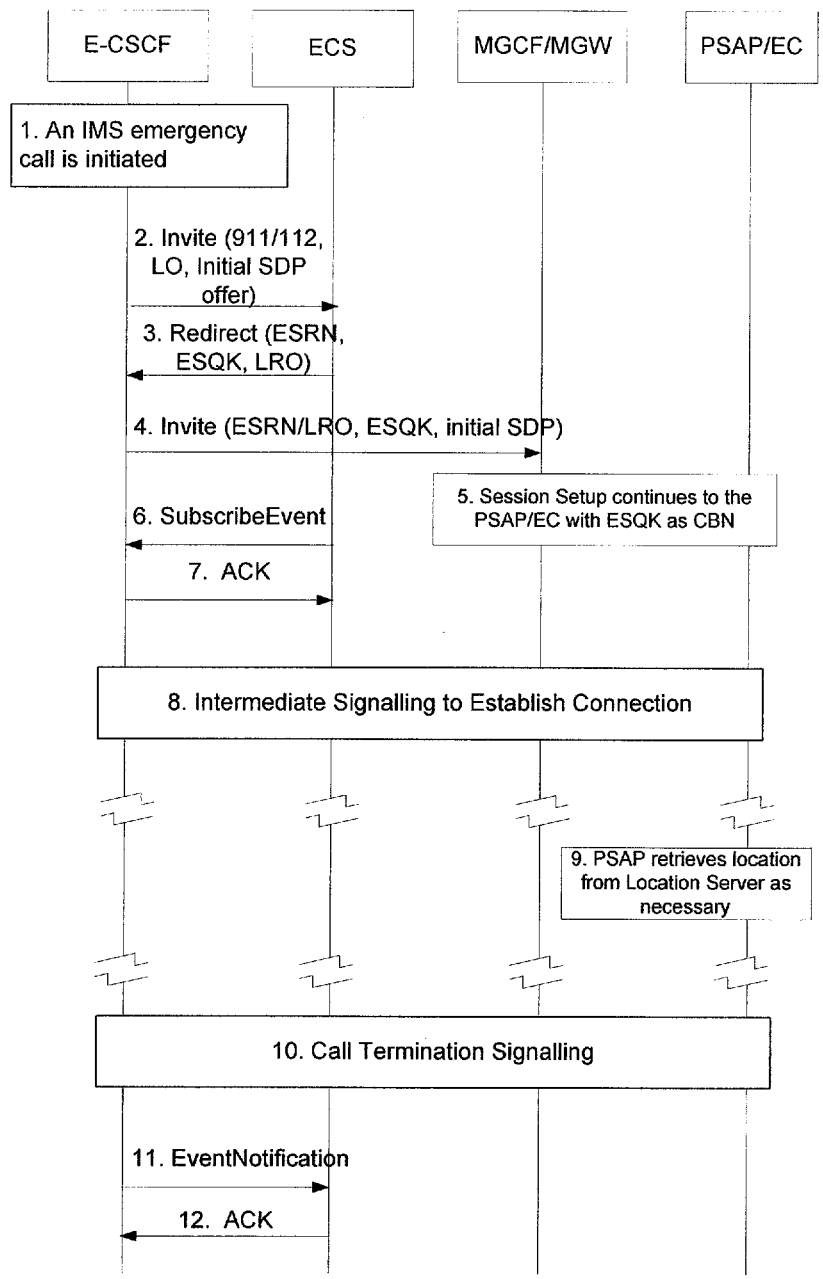
FIG. 6 illustrates an example of an ECS redirecting an IMS emergency call, according to an embodiment of the disclosure.
Figure 7:
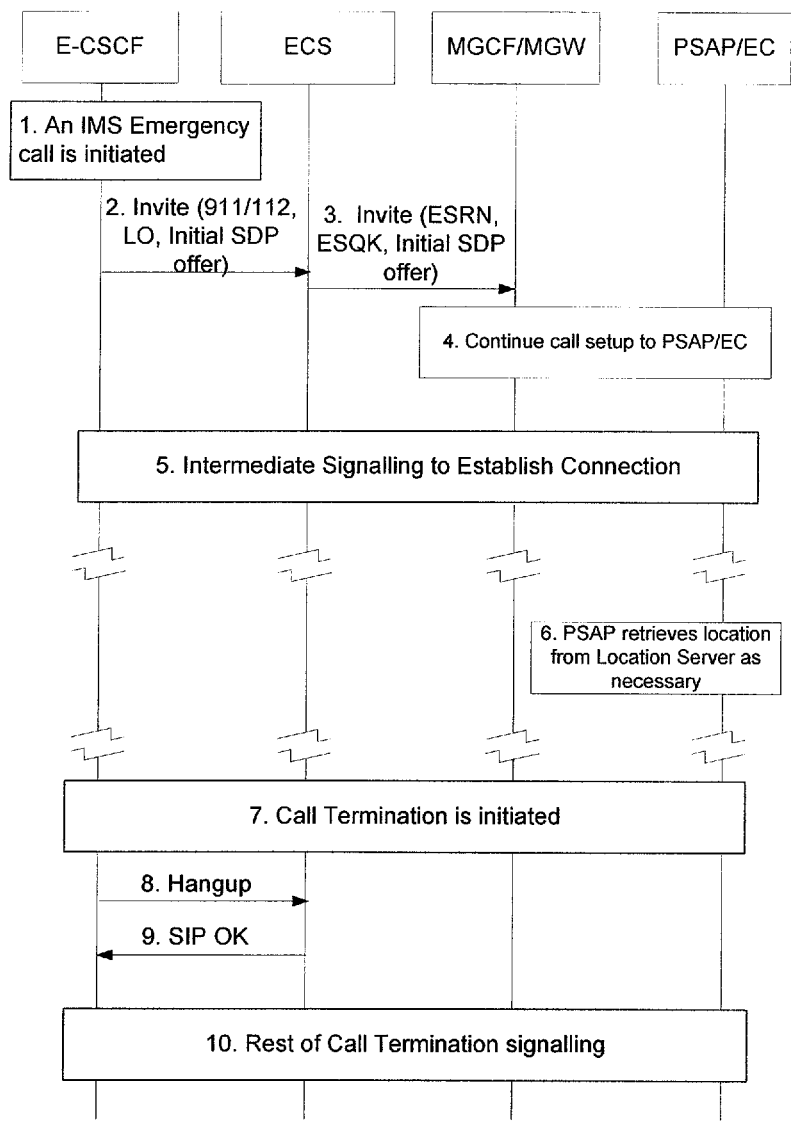
FIG. 7 illustrates an example of an ECS routing an emergency call to a gateway with a record route, according to an embodiment of the disclosure.

In yet another alternative embodiment of the first solution, it is noted that 3GPP TS 23.167 includes some examples of call flows according to NENA I2 recommendations. The examples are provided in FIGS. 6 and 7. FIG. 6 is an example of an ECS redirecting an IMS emergency call, and FIG. 7 is an example of an ECS routing the emergency call to the gateway with a record route.

It should be noted that the CBN (Call Back Number) can be the ESQK. The ESQK is allocated by a functional entity named ECS. The ECS consists of a Location Retrieval Function (LRF) and either a routing proxy or a redirect server, e.g. an ECS contains a VPC (VoIP Positioning Center) and a Routing Proxy or Redirect Server in NENA I2 architecture.

The ECS may not be compliant to 3GPP specifications. The ECS may be compliant to some basic IETF RFCs. The ECS may not be GRUU or P-Asserted-Identity header field aware. An ECS may map a FROM header field value to an ESQK. It is well known that the value of the From header field cannot be trusted (e.g. the From header field can be set to any fabricated URI). It is well known the From header field can be set to "anonymous" (e.g. in case the UE didn't detect it was making an emergency call).

The E-CSCF could perform B2BUA procedures and based on the received INVITE requesting initiation of IMS emergency session, transmit a new INVITE with the From header field set to a PSI or, if the "gr" parameter is not present in e.g. the Contact header field in said received INVITE, with the From header field set to a P-Asserted-Identity header field value in said received INVITE. If the new INVITE is transmitted with the From header field set to a PSI, then the PSI is associated with the GRUU. The ECS could then associate the new From header field value to a tel URI used as CBN.

In the event the PSAP makes a call back, the CBN is hosted by the ECS, where it is associated with a From header field set to a P-Asserted-Identity header field value or set to a PSI. In case the From header field is set to a P-Asserted-Identity header field value, then the ECS will route an INVITE to the UE's home network. In case the From header field value is set to a PSI, the request will be routed to the functional entity hosting the PSI in the visited network. Upon arrival in the visited network, the request's Request URI field will be set to the GRUU as part of the PSI association. The GRUU is resolved by the Home S-CSCF. The GRUU is guaranteed to resolve to the UE containing the instance ID in use when making the original emergency call, thereby satisfying the requirements in 3GPP TS 22.101.

The flow of FIG. 6 is supported by the procedures in clause 7.3, where the E-CSCF need not enquire the LRF for location information. Additional steps defined here are standard SIP methods, but not defined in this specification. The following is a detailed description of the procedure of FIG. 6.

1) An IMS emergency call is initiated.
2) The E-CSCF sends an Invite message with 911 or other well known emergency number as the dialled number, the UE's location information in a Location Object (LO) if available, and the UE's media capabilities encapsulated in a SDP payload, to the ECS.
3) Based on the received Location Object (LO), the ECS will determine to which PSAP/EC the call should be routed and allocate an ESQK from the ESQK pool associated with that particular PSAP/EC. The ECS then will format a SIP response with the retrieved ESRN/ESQK in the Contact fields to redirect the emergency call.
4) The IMS Core uses the ESRN/ESQK received in the call redirect message to format an INVITE message properly, and sends it to the MGCF/MGW. A P-Asserted-Identity field may be inserted in the INVITE message, it contains either an ESQK or the CBN.
5) The emergency call setup continues with the PSAP/EC.
6) The ECS initiates a subscription at the IMS Core to request a notification of call termination of the emergency call.
7) An acknowledgement is returned.
8) The emergency session establishment signalling continues.
9) The PSAP retrieves location from the ECS.
10) The emergency session is released.
11) The IMS Core sends an EventNotification message to the ECS with an Event indicating that the 911 call has been terminated. At this time, the ESQK allocated to the emergency session can be released.
12) An acknowledgement is returned to the IMS Core.

The flow of FIG. 7 is supported by the procedures in clause 7.3, where the E-CSCF need not enquire the LRF for location information. The following is a detailed description of the procedure of FIG. 7.

1) An IMS emergency call is initiated.
2) The E-CSCF sends an Invite message with 911 or other well known emergency number as the dialled number, the UE's location information in a Location Object (LO) if available, and the UE's media capabilities encapsulated in a SDP payload, to the ECS.
3) Based on the received Location Object (LO), the ECS will determine to which PSAP/EC the call should be routed and allocate an ESQK from the ESQK pool associated with that particular PSAP/EC. The ECS then re-issues an Invite to an appropriate MGCF/MGW with the ESRN/LRO, ESQK and a record route indication, or the call to be routed to PSAP the P-Asserted-Identity contains ESQK, A P-Asserted-Identity field may be inserted in the INVITE message, f for the call to be routed to other emergency answering centre the P-Asserted-Identity contains the CBN.
4) The emergency call setup continues with the PSAP/EC.
5) The emergency session establishment signalling continues.
6) The PSAP retrieves location from the ECS.
7) Either the caller or PSAP initiates the call termination signalling.
8) The E-CSCF or MGCF/MGW forwards the hangup message to the ECS. At this time, the ESQK allocated to the emergency session can be released.
9) The ECS sends an OK to the E-CSCF or MGCF/MGW.
10) The call termination signalling continues.

In a second solution, if a P-CSCF is unable to assign a tel URI uniquely identifying the UE, the P-CSCF could route the request to a Home AS capable to insert a tel URI. The P-CSCF could insert a PSI identifying the Home AS capable to insert a tel URI, and the P-CSCF could modify the Route header field to include the address of the E-CSCF. Subsequently, Home AS capable to insert a tel URI receives the request, adds a PSI in the form of a tel URI as a P-Asserted-Identity, and modifies the request's Request URI only to include the E-CSCF URI as found in the Route header field. The Home AS capable to insert a tel URI would perform much the same procedures as the E-TEL-PSI AS above.

If the CS PSAP initiates a call back, the UE's Home MGCF will receive the IAM with E.164 number. The Home I/S-CSCF will then forward the request to the AS hosting the PSI in the form of the tel URI, containing the E.164 number in said IAM. The Home AS capable to insert a tel URI will perform 3pcc and initiate a request towards the maintained P-Asserted-identity header field value in a URI with 'sip' or 'sips' scheme or towards the maintained public GRUU. The Home S-CSCF will connect with the P-CSCF and the P-CSCF will hand the PSAP call back session request to the UE.

Alternatively, the AS may retrieve the C-MSISDN as discussed in S2-090520 & S2-090521 and assign it to P-Asserted-Identity header field prior to forwarding the message to the (visited) E-CSCF.

For example, in Rel-7, the AS will have to retrieve from the HSS the C(orelation)-MSISDN(s) associated with all the IMPIs (IP Multimedia Private Identity) associated with the IMPU (IP Multimedia Public Identity) that has originated the session. The AS shall select a single C-MSISDN and shall use it to populate the P-Asserted-Identity header field with a tel URI representing the C-MISDN. The CS PSAP can then eventually use it as a CSRN (CS domain routing number) for routing call back to the UE at least partially through the CS domain.

In a first alternative under a third solution, it is noted that, recently, 24.229 has included a backwards notification to be sent from the E-CSCF to UE. The same backwards notification message can contain an E.164 number. Upon receipt of a backwards notification with an E.164 number, a UE can be instructed to add the number to the registration set using a REGISTER request. The number could be a PSI as discussed with regard to the first solution. Alternatively, it could be a C-MSISDN as discussed in S2-090520 & S2-090521. This could require the home HSS to make the C-MSISDN available and it could require the IMS device to have a C-MSISDN assigned even though the IMS device may not have CS interfaces or have otherwise no need for a MSISDN.

For example, in Rel-7, the AS will have to retrieve from the HSS the C-MSISDN(s) associated with all the IMPIs associated with the IMPU that has originated the session. The AS shall select a single C-MSISDN and shall use it to populate the P-Asserted-Identity header field with a tel URI representing the C-MISDN. The CS PSAP can then eventually use it as a CSRN for routing call back to the UE at least partially through the CS domain.

In deployments where a PSAP Call Back can occur within a limited window, the UE may store this E.164 number persistent storage, along with a timer, such that if the UE needs to reregister during this window, the UE can reregister the E.164 number for as long as the window hasn't expired.

In a second alternative under the third solution, if a UE has knowledge of a CS routable number that can identify the UE and a UE is informed it made an emergency call (by means of a backwards notification), the UE can include the routable number in a subsequent SIP message (e.g. SIP UPDATE request). The SIP UPDATE request can then be transmitted to the functional entity maintaining the association between the PSI and the GRUU or P-Asserted-Identity header field value or other UE identifying information stored in the network. The CS routable number included in said SIP message can then be added to the association or it can be transmitted somehow to the PSAP, e.g. by means of a PSAP using correlation information to retrieve information stored in the network that is associated with the emergency call such as location information in various stage of granularity.

Furthermore, in general, if multiple call back addresses are available, the call back could be tried using at least some of the multiple call back addresses. E.g. in case of receiving unsatisfactory results when dialing one call back address, another call back address can be tried.

A fourth solution is a hybrid solution where a network does provide a suitable tel URI if it can (e.g. for UEs that are assigned C-MSISDNs). The network can also indicate which of the URIs is suitable for uniquely identifying the UE. For example, an indicator or URI param may be added to the URI known to be equal to a MSISDN or known to uniquely identify the UE. E.g.:

P-Associated-URI: <sip:tobias@home1.com>, <sip:tobi@home1.com>,
<sip:gameMaster@home1.com>, <tel:+44-123-456-789;msisdn>,
<sip:+44-123-456-111@home1.com;user=phone >
or
P-Associated-URI: <sip:tobias@home1.com>,
<sip:tobi@home1.com;unique>, <sip:gameMaster@home1.com>,
<tel:+44-123-456-789;unigue>, <sip:+44-123-456-
111@home1.com;user=phone >

The P-CSCF could strip these indications prior to forwarding the SIP message to the UA. However, the P-CSCF could also maintain them and use the indications when deciding which URI to assign P-Asserted-Identity header field in case of an emergency call.

In cases where a network does not provide a suitable tel URI (e.g. for UEs that are not assigned C-MSISDNs), another embodiment would be applicable.

In a fifth solution, it is noted that the IETF is working on a marking for emergency call backs. Such an indicator should be added by the functional elements involved in order to prevent feature interaction with subscription services. In addition, the indicator may prevent undesirable interactions on the UE upon receipt of the PSAP call back session. In case the IETF fails to complete a marking or in addition to the marking, a P-Asserted-identity header field can be set to a well known emergency number such as 112 or 911 (as specified in 3GPP TS 22.101). Upon receipt of a SIP request with a P-Asserted-identity header field set to a well known emergency number, the UE can detect the received request is a request originated by a PSAP.

A temporary tel URI to be assigned to emergency calls that have no tel URI assigned has been previously discussed. However, the existing solutions have a drawback that the tel URI is associated during the emergency registration and for the time the emergency registration is valid. In addition, the tel URI is assigned by the home network even if no regulatory requirements may compel the home network operator to reserve E.164 numbers for this purpose.

In addition, in version 7.1.0 of 3GPP TS 23.167, a definition for ESQK was established as follows:

Emergency Service Query Key (ESQK): A 10-digit North American Numbering Plan number used to identify a particular emergency call instance. It is used by the LRF as a key to look up for the location information and callback information associated with the emergency call instance and is also used by the PSAP to query location information from the LRF.

In some deployments the ESQK is used to identify the emergency call instance, encoded as tel URI and offered to the CS PSAP or CS Emergency Centre.

In addition, since version 8.3.0 of 3GPP TS 23.167, the E-CSCF assigns tel URIs (albeit tel URIs that represent non-dialable numbers).

Where required by local regulation, the E-CSCF shall derive a non-dialable callback number to include as the UE's identity in the session establishment request and the location/routing request (e.g. see Annex C of J-STD-036 [23]).

When combining all these procedures, it appears that no special architectural enhancements are needed to be able to offer a CS PSAP a tel URI when an emergency call is made.

Thus, the present disclosure provides that a temporary tel URI is assigned if needed. When roaming, the visited network assigns the tel URI, if needed. The tel URI is associated with the emergency call instance for a period of time that is determined by operator policy or regulator requirement. The E-CSCF seems most suitable for allocating the temporary tel URI and routing a call back to the address information associated with the past emergency call instance.

Based on the discussion above, the present disclosure provides for:
  enabling the E-CSCF to assign a temporary tel URI if needed;
  enabling the E-CSCF to maintain the association between the tel URI and the information associated with the (past) emergency call instance for a period of timer determined by operator policy;
  in Rel-7 and Rel-8, optionally enabling the E-CSCF to route a PSAP call back if received on the assigned tel URI (since no requirements for PSAP call back session exist in Rel-8 or Rel-8 of 3GPP TS 22.101).

These embodiments would not depend on emergency registration and would not be wasteful of E.164 numbers under conditions where E.164 numbers are not required to be allocated for the purpose of identifying an emergency call routed to a CS PSAP.

Figure 8:
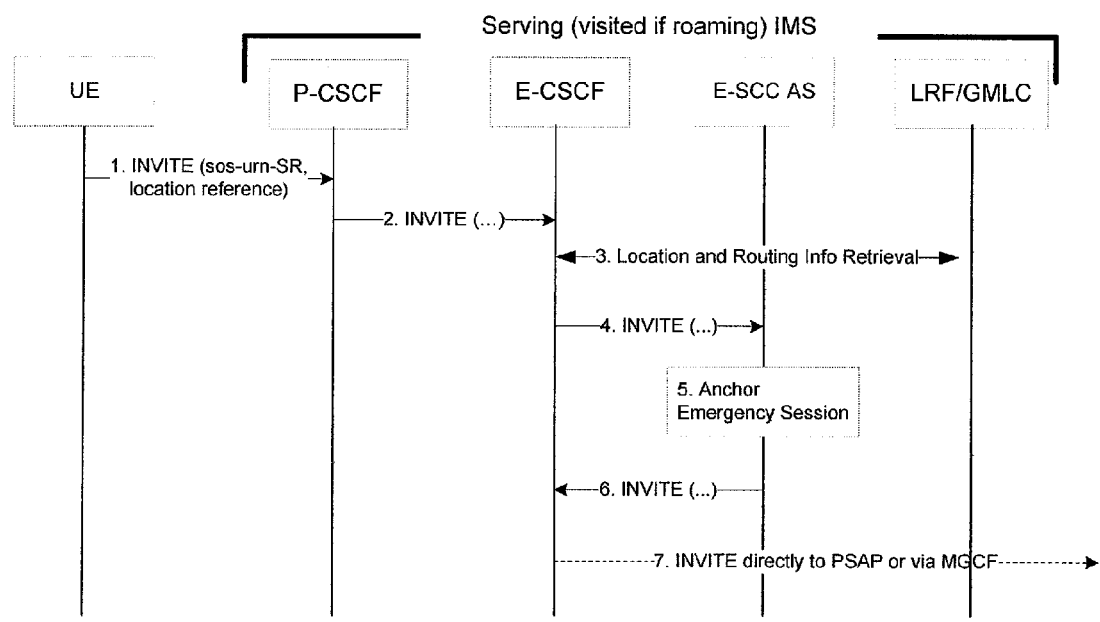
FIG. 8 illustrates a UE initiating an emergency session in IMS, according to an embodiment of the disclosure.

FIG. 8 provides an example flow for an emergency session established in IMS, illustrating how the emergency session is anchored. The following is a detailed description of the procedure of FIG. 8.

1. The UE initiates an IMS emergency session over EPS or HSPA (according to the agreed solution defined in TR 23.869) and the procedures defined in TS 23.167. This involves the UE generating a SIP INVITE request containing the UE's location information.
2. The P-CSCF selects an E-CSCF and forwards the SIP INVITE request to the E-CSCF.
3. According to TS 23.167, subclause 6.2.2, the E-CSCF can allocate a tel URI. The E-CSCF can send the request to LRF according to TS 23.167. In some deployments, the information provided by the LRF to the E-CSCF (e.g. ESQK) can include location information, correlation information identifying both the LRF and the emergency session record in the LRF, or the address of the point of presence of the PSAP. According to TS 23.167, subclause 6.2.2, the E-CSCF assigns this information to the SIP INVITE request.
4. The E-CSCF sends the SIP INVITE request to the E-SCC-AS.
5. The E-SCC-AS (acting as a routing B2BUA) anchors the emergency session, i.e. the E-SCC-AS is inserted in the signalling path which invokes a 3pcc for enablement of Domain Transfers for the call as specified in TS 23.237.
6. The E-SCC AS creates a new SIP INVITE request and sends it back to E-CSCF.
7. The E-CSCF uses the routing information to format the SIP INVITE request, and it sends it directly to the PSAP, or to the PSAP via the MGCF.

Figure 9:
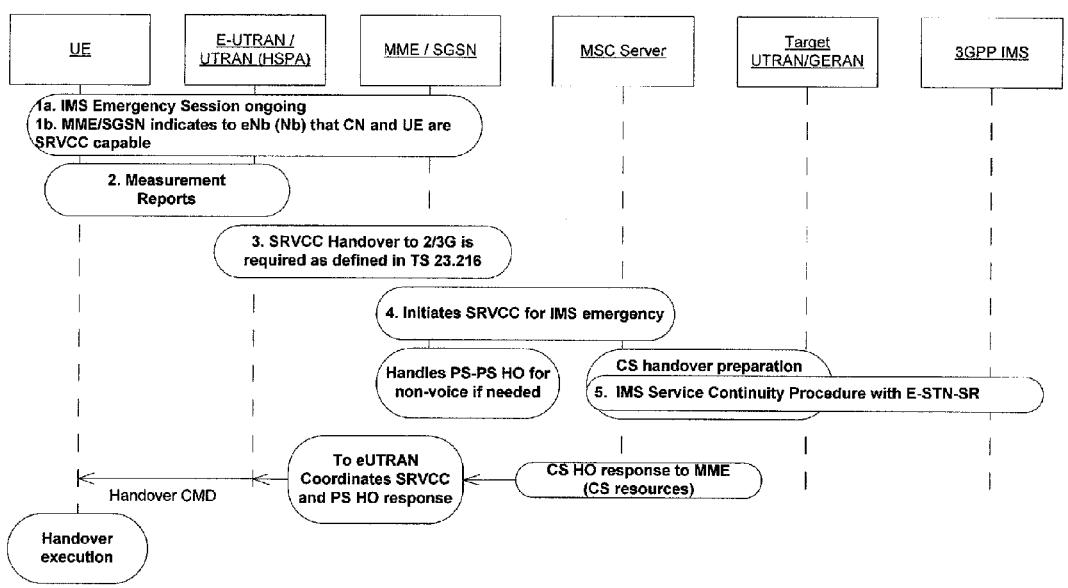
FIG. 9 illustrates a bearer-level call flow for SR VCC for an IMS emergency session with E-STN-SR, according to an embodiment of the disclosure.

The call flow in FIG. 9 illustrates the bearer level for an SR VCC procedure for an IMS emergency session. The following is a detailed description of the procedure of FIG. 9.

1a, 1b UE has initiated IMS Emergency session. E-UTRAN/UTRAN is aware that both the UE and CN support SR VCC as defined in TS 23.216. MME/SGSN is aware that IMS Emergency session is ongoing.
2, 3 EUTRAN (UTRAN) determines that SR VCC is needed based on same mechanism defined in TS 23.216.
4. MME/SGSN invokes SR VCC via Sv interface to MSC enhanced with SR VCC. MME/SGSN knows this is related to SR VCC IMS emergency. Either E-STN-SR is configured locally in MME and transferred to MSC or MME sends an Emergency indication to MSC and lets MSC to utilize its local configured E-STN-SR. MME may also send location related information to MSC to support location continuity as defined in TR 23.891. For the case of UEs operating in Limited Service Mode using equipment identifier the MME/SGSN includes the equipment identifier in this message.
5. MSC initiates the session transfer with E-STN-SR. The IMS procedure is illustrate in FIG. 6.1.3.2-2. The rest of the SR VCC procedures follow TS 23.216. MSC needs to support location continuity as defined in TR 23.891.

Figure 10:
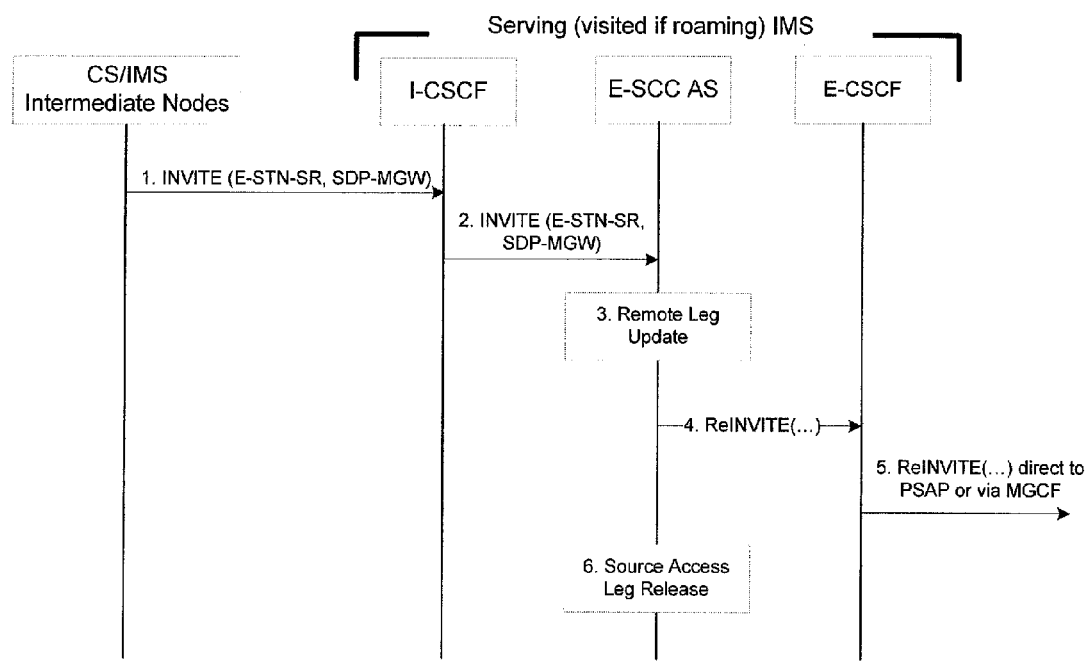
FIG. 10 illustrates an IMS-level call flow for SR VCC for an IMS emergency session with E-STN-SR, according to an embodiment of the disclosure.

The call flow in FIG. 10 illustrates the IMS level for an SR VCC procedure for an IMS emergency session for the authenticated case. The following is a detailed description of the procedure of FIG. 10.

1. MSC server initiates the session transfer with the E-STN-SR.
2. The I-CSCF routes the SIP INVITE request directly to the E-SCC AS by using similar procedures to that defined in TS 23.228, subclause 5.7.5 "PSI based Application Server termination—direct".
3-4. The E-SCC AS uses the E-STN-SR to determine that Access Transfer is requested. The E-SCC AS proceeds with the Access Transfer of the active session with bi-directional speech for the UE by updating the Remote Leg with the media description and other information using the Remote Leg Update procedure as specified in subclause 6.3.1.5 of TS 23.237 (i.e. by sending a SIP Re-INVITE request to update the Remote Leg).
5. The E-CSCF forwards the SIP Re-INVITE request to the MGCF associated with the PSAP if the PSAP is located in the PSTN or CS Domain (the u-plane path is switched between the UE and the MGW) or the SIP Re-INVITE request is sent directly to an IP-capable PSAP (the u-plane path between the UE and the PSAP is switched end-to-end).
6. When session modification procedures complete, the source access leg (i.e. the access leg previously established over IMS) is released as specified in subclause 6.3.1.6 of TS 23.237.

The following 3rd Generation Partnership Project (3GPP) Technical Specifications (TS) are incorporated herein by reference: TS 23.167 V9.0.0 (2009-03), TS 22.101, TS 23.228, TR 23.870, and TS 24.229. Also incorporated herein by reference are Change Request 1378 to TS 24.229, Change Request 0057 to TS 23.167, and Change Request 0064 to TS 23.167.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for identifying a device with a user agent (UA) during an emergency for callback, said method comprising:
 receiving, by a processor, a session initiation protocol (SIP) INVITE with a SIP address of the UA via a packet switched domain, the SIP INVITE initiated by the UA during an emergency call;
 storing the SIP address of the UA, comprising associating the SIP address with the emergency call;
 associating, by the processor, in a in which the UA is currently present, an E.164 number associated with location information of the device with the stored SIP address of the UA that placed the emergency call;
 routing the emergency call via a circuit switched domain comprising transmitting the E.164 number;
 receiving a return SIP INVITE comprising the E.164 number in response to a callback from the circuit switched domain:
 determining the SIP address of the UA based upon the association between the E.164 number and the stored SIP address; and
 routing the return SIP INVITE to the UA via the packet switched domain.

2. The method of claim 1, wherein the E.164 number is a uniform resource identifier (URI).

3. The method of claim 2, wherein the URI is a tel URI or a temporary tel URI.

4. The method of claim 1, wherein the association between the E.164 number and the SIP address of the UA is temporary.

5. The method of claim 1, wherein the period of time that the association is maintained between the E.164 number and the SIP address of the UA is based on at least one of:
   a regulation applicable to the UA's current location;
   a policy applicable to the UA's current location;
   a regulation applicable to the UA's current network; and
   a policy applicable to the UA's current network.

6. The method of claim 1, wherein a request is received including the E.164 number; and retrieving the SIP address of the UA based on the E.164 number after the emergency call is placed; and routing the call based on the SIP address of the UA.

7. A network component, comprising:
   a processor configured to:
   receive a session initiation protocol (SIP) INVITE with a SIP address of a user agent (UA) via a packet switched domain, the SIP INVITE initiated by the UA during initiation of an emergency call by the UA, comprising associating the SIP address with the emergency call,
   associate the SIP address with an E.164 number associated with location information of the device,
   the emergency call being routed via a circuit switch domain to a public safety answering point comprising transmitting the E.164 number,
   receive a return SIP INVITE comprising the E.164 number in response to a callback from the circuit switched domain;
   determine the SIP address of the UA based upon the association between the E.164 number and the stored SIP address; and
   route the return SIP INVITE to the UA via the packet switched domain.

8. The network component of claim 7, wherein the E.164 number is a uniform resource identifier (URI).

9. The network component of claim 8, wherein the URI is a tel URI or temporary tel URI.

10. The network component of claim 7, wherein the association between the E.164 number and the SIP address of the UA is temporary.

11. The network component of claim 7, wherein the period of time that the association is maintained between the E.164 number and the SIP address of the UA is based on at least one of:
   a regulation applicable to the UA's current location;
   a policy applicable to the UA's current location;
   a regulation applicable to the UA's current network; and
   a policy applicable to the UA's current network.

12. The network component of claim 7, wherein the association between the E.164 number and the SIP address of the UA is performed after the emergency call is placed.

13. The method of claim 1, wherein the SIP address is a SIP uniform resource identifier (URI).

14. The network component of claim 7, wherein the SIP address is a SIP uniform resource identifier (URI).

15. The method of claim 1, wherein the SIP address is a public globally routable UA uniform resource identifier (GRUU).

16. The network component of claim 7, wherein the SIP address is a public globally routable UA uniform resource identifier (GRUU).

* * * * *